(12) United States Patent
Son et al.

(10) Patent No.: US 9,869,830 B2
(45) Date of Patent: Jan. 16, 2018

(54) OPTICAL TRANSCEIVER DEVICE

(71) Applicant: OPTOMIND INC., Suwon-si, Gyeonggi-do (KR)

(72) Inventors: Yung-sung Son, Yongin-si (KR); Bong-cheol Kim, Seoul (KR)

(73) Assignees: OPTOMIND INC. (KR); MITSUBISHI GAS CHEMICAL COMPANY, INC. (JP)

( * ) Notice: Subject to any disclaimer, the term of this patent is extended or adjusted under 35 U.S.C. 154(b) by 0 days.

(21) Appl. No.: 15/039,477

(22) PCT Filed: Nov. 28, 2014

(86) PCT No.: PCT/KR2014/011594
§ 371 (c)(1),
(2) Date: May 26, 2016

(87) PCT Pub. No.: WO2015/080533
PCT Pub. Date: Jun. 4, 2015

(65) Prior Publication Data
US 2017/0205593 A1    Jul. 20, 2017

(30) Foreign Application Priority Data

Nov. 28, 2013  (KR) .......................... 10-2013-0146599

(51) Int. Cl.
*G02B 6/42*    (2006.01)
*G02B 6/32*    (2006.01)

(52) U.S. Cl.
CPC ............. *G02B 6/4231* (2013.01); *G02B 6/32* (2013.01); *G02B 6/428* (2013.01); *G02B 6/4214* (2013.01); *G02B 6/4244* (2013.01); *G02B 6/4255* (2013.01)

(58) Field of Classification Search
CPC .................................................. G02B 6/4231
See application file for complete search history.

(56) References Cited

U.S. PATENT DOCUMENTS 6,526,206 B2 *  2/2003  Kunkel ............... G02B 6/4292
                                                         33/645
7,441,965 B2 * 10/2008  Furuno ............... G02B 6/4204
                                                         385/15
(Continued)

FOREIGN PATENT DOCUMENTS

JP    2004317627 A    11/2004
JP    2008158473 A     7/2008
(Continued)

OTHER PUBLICATIONS

International Search Report (in English and Korean) and Written Opinion (in Korean) for PCT/KR2014/011594 dated Dec. 23, 2014; ISA/KR.

(Continued)

*Primary Examiner* — Omar R Rojas
(74) *Attorney, Agent, or Firm* — Harness, Dickey & Pierce, P.L.C.

(57) ABSTRACT

An optical transceiver device includes a baseplate including a set position for mounting an optical element, an alignment plate including a mounting unit, a first and a second reference hole. The device includes an optical-fiber fixing block configured to fixedly mount at least one of a lens unit and an optical fiber optically linked with the optical element and to include a first and a second post, and a housing for enclosing the optical-fiber fixing block and alignment plate. The second post is inserted into the second reference hole in a looser manner than inserting the first post into the first reference hole, and the set position is determined by a first baseline passing through the first and the second reference hole and by a second baseline intersecting with the first baseline and positioned on opposite side of the second reference hole with respect to the first reference hole.

10 Claims, 24 Drawing Sheets

(56) References Cited

U.S. PATENT DOCUMENTS

| | | | |
|---|---|---|---|
| 9,423,569 B2* | 8/2016 | Son | ................ G02B 6/3616 |
| 2003/0053786 A1* | 3/2003 | Kato | .................. G02B 6/43 |
| | | | 385/134 |
| 2013/0129281 A1 | 5/2013 | Son et al. | |
| 2015/0293309 A1 | 10/2015 | Son et al. | |

FOREIGN PATENT DOCUMENTS

| | | | |
|---|---|---|---|
| JP | 2009-58847 A | 3/2009 | |
| JP | 2011-39186 A | 2/2011 | |
| JP | 2012-252261 A | 12/2012 | |
| JP | 2013-235243 A | 11/2013 | |
| KR | 1020080040416 A | 5/2008 | |
| KR | 102012002967 A | 3/2012 | |

OTHER PUBLICATIONS

Japanese Office Action (in Japanese) dated May 1, 2017 regarding JP Application No. 2016534920 with transmittal letter (in English) (8 pages).

\* cited by examiner

OPTICAL TRANSCEIVER DEVICE

CROSS REFERENCE TO RELATED APPLICATIONS

This application is a U.S. National Phase Application under 35 U.S.C. 371 of International Application No. PCT/KR2014/011594 filed on Nov. 28, 2014 and published in Korean as WO 2015/080533 A1 on Jun. 4, 2015. This application claims priority to Korean Patent Application No. 10-2013-0146599 filed Nov. 28, 2013. The entire disclosures of all of the above applications are incorporated herein by reference.

TECHNICAL FIELD

The present disclosure, in some embodiments, relates to an optical transceiver device, and more particularly, to an optical transceiver device employing an alignment of two circular holes on a substrate and an optical element.

BACKGROUND

The statements in this section merely provide background information related to the present disclosure and do not necessarily constitute prior art.

A signal transmission method based on an optical fiber, which is widely used in a long haul communication, is in widespread use for a large-capacity digital media transmission including a high-definition digital video display for which high-speed and high-density data transmission is required, owing to the operation characteristics unaffected by an electromagnetic interference (EMI) and usefulness in a broad bandwidth of the optical fiber.

Such a signal transmission method based on the optical fiber can be implemented by arranging a lens and a reflecting member configured between an optical fiber and an optical element. One possible way to achieve such configuration is to install the optical fiber and a structure affixed with the reflecting member and the lens on a substrate mounted with the optical element to establish an optical alignment.

This method of optical alignment can be incorporated into manufacturing an optical transceiver, where a selected way of aligning the optical element, the lens, the reflecting member and the optical fiber dictates the structural simplification, manufacturing cost reduction, and durability and precision enhancements, etc., which exhibits the paramount significance of the optical alignment issue.

However, an optical transceiver manufactured by the optical alignment of the conventional method is not only highly costly but also too bulky to fit in a mobile communication apparatus such as a smartphone, and is troubled with instability issues due to a complicated structure.

FIG. 1 is a plan view of a typical optical transceiver device.

In FIG. 1, a substrate 101 is shown as mounted with an injection-molded structure 102. In general, the injection-molded structure 102 with precision holes is used as a guide because of the recognized difficulty of forming precision holes on the substrate 101 to mount another structure thereto. Optical elements 103 are disposed on the substrate 101. The substrate 101 includes two circular holes 104 formed in line with the arrangement of the optical elements 103, and the injection-molded structure 102 includes two round posts 105. The two round posts 105 are respectively inserted into the circular holes 104, and the optical alignment is achieved by further arranging a lens structure on the assembled injection-molded structure 102.

With the conventional technology, deviation of the optical alignment can be reduced to some extent; however, there still remain issues of complexity of assembling additional parts, inferior economic feasibility, and increased volume of the entire structure.

In addition, due to the nature of the structure that hardly provides the perfect fit in the coupling between the hole and the post as shown in FIG. 1, the hole and post affixed on one side lead to undesirable tolerances in the remaining hole and post on the other side. This leaves a certain amount of deviation in the optical alignment, which can cause critical technical issues in a field requiring a high level of precision.

DISCLOSURE

Technical Problem

To effectively resolve the above-mentioned problems, the present disclosure, in some embodiments, provides a new form of optical transceiver device capable of optically aligning an optical element and an optical fiber based on a first reference hole, a second reference hole, a first baseline and a second baseline.

Another embodiment of the present disclosure seeks to provide a new form of optical transceiver device with increased permissible tolerances in the components thereof to eventually achieve an excellent economic feasibility, easier manufacturing, and other advantages by downsizing the optical transceiver device.

The technical problems of embodiments of the present disclosure are not limited to the abovementioned and other unmentioned technical problems to be addressed by this disclosure will be better understood by a Person Having Ordinary Skill in the Art (PHOSITA) from reading the following detailed description.

SUMMARY

In accordance with some embodiments of the present disclosure, an optical transceiver device includes a baseplate including a set position for mounting an optical element, an alignment plate, an optical-fiber fixing block, and a housing. The alignment plate includes a mounting unit for mounting the alignment plate on the baseplate, a first reference hole, and a second reference hole spaced by a first distance from the first reference hole. The optical-fiber fixing block is configured to fixedly mount at least one of a lens unit and an optical fiber optically linked with the optical element, and to include a first post configured to be inserted into the first reference hole and a second post configured to be inserted into the second reference hole. And the housing is configured to enclose the optical-fiber fixing block and the alignment plate. The second post is configured to be inserted into the second reference hole in a looser manner than when the first post is inserted into the first reference hole, and the set position is determined by a first baseline that passes through the first reference hole and the second reference hole and by a second baseline that intersects with the first baseline and is positioned with a second distance from the first reference hole on an opposite side of the second reference hole with respect to the first reference hole.

Further, in accordance with some embodiments of the present disclosure, an optical transceiver device is configured to be mounted on a baseplate including an optical element mounted thereon, a first reference hole and a second reference hole spaced by a first distance from the first reference hole. The optical transceiver device includes an optical-fiber fixing block and a housing. The optical-fiber fixing block is configured to fixedly mount at least one of a lens unit and an optical fiber optically linked with the optical element, and to include a first post configured to be inserted into the first reference hole and a second post configured to be inserted into the second reference hole. And the housing is configured to enclose the optical-fiber fixing block. The second post is configured to be inserted into the second reference hole in a more movable manner than when the first post is inserted into the first reference hole, and the optical element is mounted on the baseplate at a set position which is determined by a first baseline that passes through the first reference hole and the second reference hole and by a second baseline that intersects with the first baseline and is positioned with a second distance from the first reference hole on an opposite side of the second reference hole with respect to the first reference hole, and the second distance is shorter than the first distance.

Moreover, in accordance with some embodiments of the present disclosure, an optical transceiver device includes a baseplate and an optical-fiber fixing block. The baseplate includes a set position for mounting an optical element, a first reference hole and a second reference hole spaced by a first distance from the first reference hole. And the optical-fiber fixing block is configured to fixedly mount at least one of a lens unit and an optical fiber optically linked with the optical element, and to include a first post configured to be inserted into the first reference hole and a second post configured to be inserted into the second reference hole. The second post is configured to be inserted into the second reference hole in a looser manner than when the first post is inserted into the first reference hole, and the set position is determined by a first baseline that passes through the first reference hole and the second reference hole and by a second baseline that intersects with the first baseline and is positioned between the first reference hole and the second reference hole with a second distance from the first reference hole.

Advantageous Effects

According to some embodiments of the present disclosure as described above, an optical alignment of an optical element and an optical fiber can be performed in a simple manner, so as to minimize a misalignment.

Further, an optical transceiver device manufactured by the optical alignment method according to some embodiments of the present disclosure can be downsized and made available from, for example, a simple combination of relatively inexpensive components, and hence the manufacturing cost can be reduced.

Besides, the present disclosure has various effects according to the exemplary embodiments, such as an excellent durability, which effects can be clearly confirmed in the detailed description of the embodiments described below.

Figure 1:
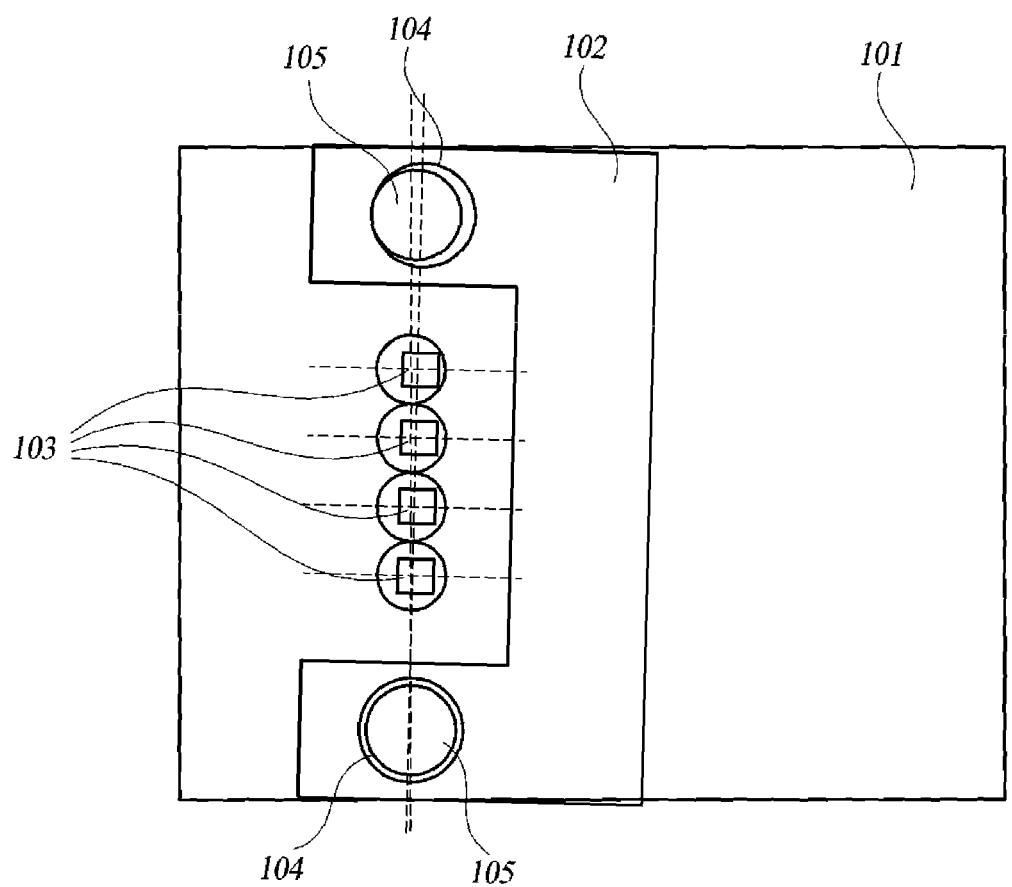
FIG. 1 is a plan view of a typical optical transceiver device.

| REFERENCE NUMERALS | |
|---|---|
| 101: Circuit board | 102: Injection-molded structure |
| 103: Optical element | 104: Circular post |
| 105: Circular hole | 210', 210: Baseplate |
| 211', 211: First baseline | 212', 212: First spacing |
| 213', 213: Second spacing | 214', 214: Second baseline |
| 215', 215: Optical element | 216: Fourth baseline |
| 217', 217: Third spacing | 300', 300: Optical-fiber fixing block |
| 310', 310: Optical fiber guide | 320', 320: Lens unit |
| 330', 330: Reflecting unit | 340', 340: Optical fiber |
| 350', 350: Third baseline | 400: Housing |
| 410', 410: Integrated Circuit | 420', 420: Signal channel |
| 510', 510: Signal line | 520', 520: Connector |
| A', A: First reference hole | B', B: Second reference hole |
| C', C: First post | D', D: Second post |

DETAILED DESCRIPTION

Exemplary embodiments of the present disclosure are described in detail below with reference to the accompanying drawings. In the following descriptions, like reference numerals designate like elements, although the elements are shown in different drawings. Further, detailed descriptions of known functions and configurations incorporated herein are omitted for the purpose of clarity and for brevity.

Additionally, various terms such as first, second, A, B, etc., are used solely for the purpose of differentiating one component from the other but not to imply or suggest the substances, the order or sequence of the components. In the entire specification, when a portion "comprises" or "includes" a constituent element, this does not mean to exclude another constituent element unless otherwise described particularly in view of the opposite aspect but means that another constituent element can be further included. In addition, terms such as " . . . unit" described in the specification means a unit of processing at least one function or operation, which can be implemented by hardware, software, or a combination of hardware and software.

If a component were described as 'connected', 'coupled', or 'linked' to another component, they may mean the components are not only directly 'connected', 'coupled', or 'linked' but also are indirectly 'connected', 'coupled', or 'linked' via one or more additional components.

In addition, size and shape of a constituent element shown in the drawings may be exaggerated for the sake of clear description and convenience. Further, terms specially defined considering configuration and operation of the present disclosure are merely for describing embodiments of the present disclosure, but not limiting the scope of the present disclosure.

The following embodiments instantiate the present disclosure.

In the description of constituent elements according to some embodiments of the present disclosure with reference to the accompanying drawings, the same element is assigned the same reference numeral. For example, a baseplate is assigned a reference numeral of 210 in both first and second embodiments.

In the description of the present disclosure, when detailed descriptions of related structures or functions are to repeat themselves over different embodiments, structures or functions described rather principally in a preceding embodiment will be omitted in the subsequent embodiment.

<First Embodiment>

Figure 2:
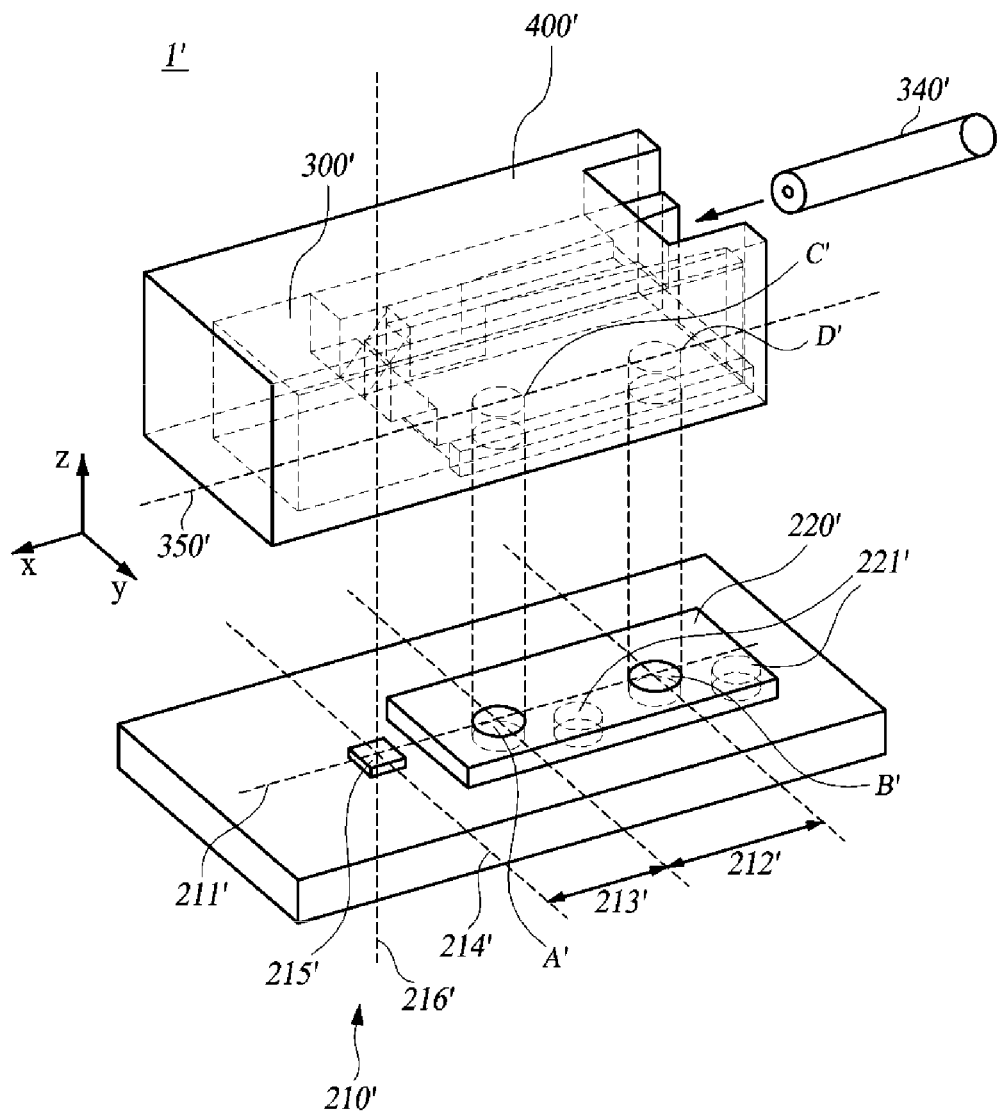
FIG. 2 is an exploded perspective view of a transmission path expander according to a first embodiment.
Figure 3A:
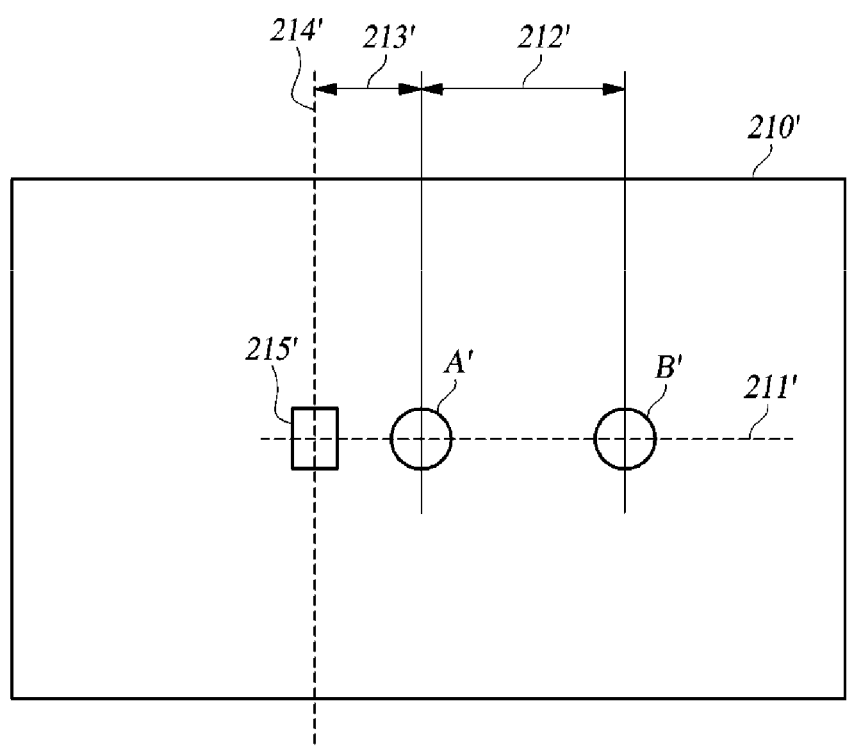
FIG. 3A is a plan view of a baseplate including a first reference hole and a second reference hole, on which an optical element is mounted, according to the first embodiment.
Figure 3B:
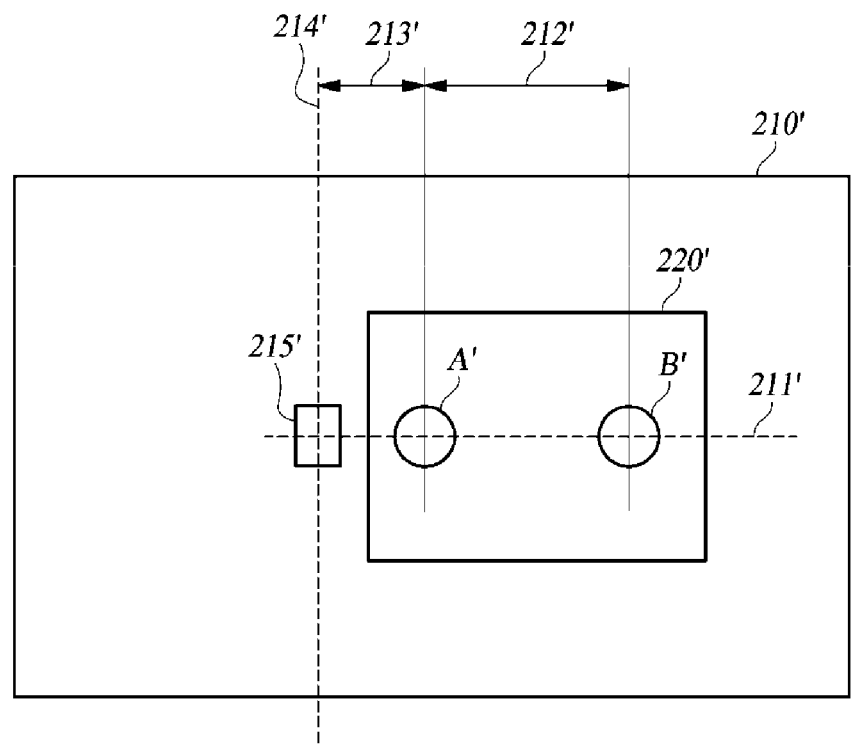
FIG. 3B is a plan view of a baseplate arranged with an optical element and an alignment plate including a first reference hole and a second reference hole, according to the first embodiment.

FIG. 2 is an exploded perspective view of a transmission path expander 1' according to a first embodiment. FIG. 3A is a plan view of a baseplate 210' including a first reference hole A' and a second reference hole B', and mounted with an optical element 215', according to the first embodiment. FIG. 3B is a plan view of the baseplate 210' mounted with the optical element 215' and an alignment plate 220' including the first reference hole A' and the second reference hole B', according to the first embodiment.

In some embodiments, the optical transceiver device is alternatively referred to as the transmission path expander 1'.

The transmission path expander 1' according to the first embodiment includes the alignment plate 220', an optical-fiber fixing block 300' and a housing 400' configured to enclose the optical-fiber fixing block 300' and the alignment plate 220'. The alignment plate 220' includes a mounting unit 221' for mounting the alignment plate 220' on the baseplate 210' on which the optical element 215' is mounted at a set position, and includes the first reference hole A' and the second reference hole B' that are spaced by a first distance 212'. The optical-fiber fixing block 300' is configured to mount at least one optical fiber 340' and a lens unit in a fixed manner, and it includes a first post C' configured to be inserted into the first reference hole A' and a second post D' configured to be inserted into the second reference hole B'.

The second post D' is configured to be inserted into the second reference hole B' in a looser manner than when the first post C' is inserted into the first reference hole A'.

The first reference hole A' and the second reference hole B' are arranged along a longitudinal direction of the optical fiber 340'. The first post C' and the second post D' are also arranged along the longitudinal direction of the optical fiber 340'. The longitudinal direction of the optical fiber 340' is a length direction of the optical fiber 340' fixedly mounted on the optical-fiber fixing block 300'. This arrangement reduces an unnecessary space in the optical alignment.

A set position is herein determined by a first baseline 211' that passes through the first reference hole A' and the second reference hole B', and a second baseline 214' that intersects with the first baseline 211' and has a second distance 213' from the first reference hole A' on an opposite side of the second reference hole B' with respect to the first reference hole A', where the second distance 213' is shorter than the first distance 212'.

The baseplate 210' is described in detail below with reference to FIGS. 3A and 3B.

The baseplate 210' is, for example, a printed circuit board (PCB). The baseplate 210' includes thereon an integrated circuit (IC) 410' that is electrically connected to the optical element 215'.

The set position is where the optical element 215' is disposed (or mounted) on the baseplate 210'. In some embodiments, there are multiples of the optical element 215'. In this case, the plurality of optical elements 215' is arranged at the set position. The first reference hole A' and the second reference hole B' are formed as through-holes penetrating the baseplate 210' or the alignment plate 220' from one side to the other side or as grooves having a predetermined depth.

The first baseline 211' and the second baseline 214' are virtual lines based on which the set position is determined.

In some embodiments, the set position is located on the second baseline 214'. That is, the optical element 215' is located on the second baseline 214' on the baseplate 210'. In some embodiments, the optical element 215' is arranged at an intersection of the first baseline 211' and the second baseline 214' on the second baseline 214'. When there are multiple optical elements 215', they are arranged along the second baseline 214'.

The first baseline 211' is defined by the first reference hole A' and the second reference hole B'. That is, the first baseline 211' is a line that passes the first reference hole A' and the second reference hole B'. In some embodiments, the first baseline 211' is a line that passes the center of the first reference hole A' and the center of the second reference hole B'. In this case, the first distance 212' is defined by an interval between the center of the first reference hole A' and the center of the second reference hole B'.

The second baseline 214' is collectively defined by the first baseline 211', the first reference hole A' and the second distance 213'. The second baseline 214' intersects with the first baseline 211' on the baseplate 210'. In some embodiments, the second baseline 214' intersects with the first baseline 211' at right angle on the baseplate 210'.

The second baseline 214' according to the first embodiment is located on the opposite side of the second reference hole B' with the first reference hole A' interposed therebetween, and intersects with the first baseline 211' having the second distance 213' from the first reference hole A'. In this case, the second distance 213' is shorter than the first distance 212'.

The determination of the set position at which the optical element 215' is arranged on the baseplate 210' requires the first reference hole A' and the second reference hole B'. However, it is hard to form the first reference hole A' and the second reference hole B' right on the baseplate 210' in a precise manner.

Therefore, in some embodiments, the baseplate 210' is provided with the first reference hole A' and the second reference hole B' by forming them precisely on the alignment plate 220' and mounting the latter on the baseplate 210'. That is, the alignment plate 220' serves to provide the precisely formed first reference hole A' and second reference hole B' on the baseplate 210'. FIG. 3B shows the alignment plate 220' mounted on the baseplate 210'.

The optical-fiber fixing block 300' and the alignment plate 220' are coupled by inserting the first post C' into the first reference hole A' and inserting the second post D' into the second reference hole B'. The first post C' is tightly inserted into the first reference hole A'. However, the second post D' is inserted into the second reference hole B' in a looser manner than the first post C' being inserted into the first reference hole A'. In some embodiments, the diameter of the second post D' is smaller than that of the first post C'. In some embodiments, the diameter of the second reference hole B' is larger than that of the first reference hole A'. With this configuration, the second post D' is inserted into the second reference hole B' in a looser manner than when the first post C' is inserted into the first reference hole A'.

Figure 4:
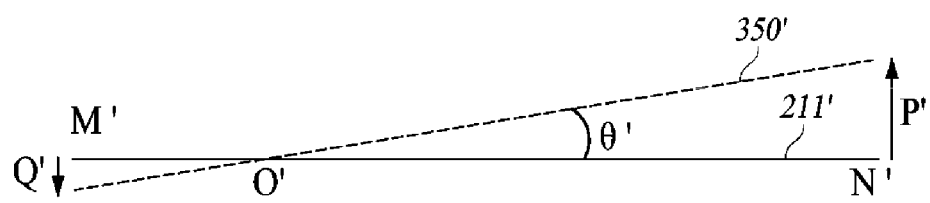
FIG. 4 is a schematic diagram for illustrating a method for aligning an optical element, according to the first embodiment.
Figure 5:
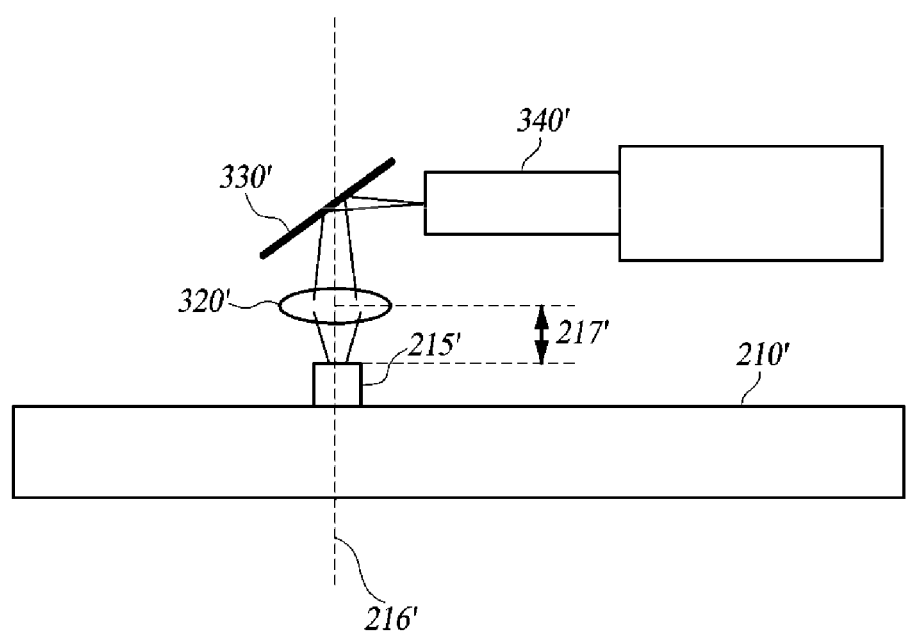
FIG. 5 is a schematic diagram for illustrating an optical alignment of an optical element, a lens unit and optical fiber, according to the first embodiment.

FIG. 4 is a schematic diagram for illustrating a method for aligning an optical element, according to the first embodiment. FIG. 5 is a schematic diagram for illustrating an optical alignment of the optical element 215', a lens unit 320' and the optical fiber 340', according to the first embodiment.

Steps of aligning the optical element 215' and the lens unit 320' are described below when a single unit of the optical element 215' is mounted on the baseplate 210'.

The optical element 215' is located at a position on the first baseline 211' with the second distance 213' from the first reference hole A'.

A third baseline 350' is defined by a line passing through the first post C' and the second post D' formed on the bottom of the optical-fiber fixing block 300'. In some embodiments, the third baseline 350' is a line passing through the center of the first post C' and the center of the second post D', and the first distance 212' is defined by an interval between the first post C' and the second post D'. That is, the distance between the center of the first post C' and the center of the second post D' is the same as the distance between the center of the first reference hole A' and the center of the second reference hole B'.

The lens unit 320' is located on the third baseline 350' as viewed in the plan view of the optical-fiber fixing block 300'. Specifically, the lens unit 320' is located on the third baseline 350' at a position with the second distance 213' from the first post C'.

When mounting the optical-fiber fixing block 300' on the baseplate 210' or the alignment plate 220', the first post C' is tightly inserted into the first reference hole A'. However, the second post D' is inserted into the second reference hole B' in a looser manner than when the first post C' is inserted into the first reference hole A'. Therefore, the second post D' is movable in the second reference hole B'.

As a result, the third baseline 350' is slightly movable in the clockwise direction or in the counterclockwise direction about the first reference hole A' serving as a rotation axis, and hence the first baseline 211' may match the third baseline 350' or they may be misaligned.

A fourth baseline 216' is defined as a virtual line which extends perpendicular to the first baseline 211' and the second baseline 214' and intersects with the second baseline 214'. When the first baseline 211' and the third baseline 350' match each other, the optical element 215' and the lens unit 320' are arranged on the fourth baseline 216'. That is, the optical element 215' and the lens unit 320' can be arranged on the same axis.

The second distance 213' is adapted to be shorter than the first distance 212'. Relative to the first post C', the second post D' is far and the lens unit 320' is close, and hence the lens unit 320' moves a little when the second post D' moves more in the second reference hole B'. Therefore, even when the first baseline 211' and the third baseline 350' do not match each other at the position of the second post D', the offset between the optical element 215' and the lens unit 320' is very small.

The ratio of the second distance 213' to the first distance 212' can be set to allow the optical fiber 340' and the lens unit 320' to be optically aligned within a predetermined tolerance. The larger the difference between the first distance 212' and the second distance 213', the smaller the ratio of a motion of the lens unit 320' to a motion of the second post D'. Therefore, increasing the difference between the first distance 212' and the second distance 213' provides a more precise alignment.

The first distance 212' and the second distance 213' are not determined in advance. A designer can set the first distance 212' and the second distance 213' in a manner that the optical element 215' and the optical fiber 340' are optically aligned within the tolerance based on a required specification, and can also set an appropriate ratio of the second distance 213' to the first distance 212'.

In some embodiments, by adopting a structure in which the second post D' is inserted into the second reference hole B' in a looser manner than when the first post C' is inserted into the first reference hole A', a deformation can be prevented from being generated when the optical-fiber fixing block 300' is forcibly fitted into the alignment plate 220' or the baseplate 210'. Therefore, a precise optical alignment can be achieved, providing the optical transceiver device with an enhanced durability.

A reflecting unit 330' is added to the lens unit 320' and the optical fiber 340' in an arrangement for establishing an optical alignment in the optical-fiber fixing block 300'. The reflecting unit 330' includes, for example, a mirror or a prism.

Through the optical alignment, light emitted from a facet of the optical fiber 340' is deflected by the reflecting unit 330' and focused by the lens unit 320' before arriving at the optical element 215', and light emitted from the optical element 215' is focused by the lens unit 320' and deflected by the reflecting unit 330' before arriving at the facet of the optical fiber 340'.

When the first baseline 211' and the third baseline 350' match each other, the optical element 215' and the lens unit 320' can be arranged on the fourth baseline 216'. In this case, the optical element 215' and the lens unit 320' can be arranged with a third distance 217' maintained therebetween. The designer can set the third distance 217'.

When the alignment plate 220' is not employed, the third distance 217' can be determined by a height of a position of the lens unit 320' in the optical-fiber fixing block 300'. When the alignment plate 220' is employed, the third distance 217' can be determined by a length obtained by summing the height of the alignment plate 220' and the height of the position of the lens unit 320' in the optical-fiber fixing block 300'. An operator can arrange the optical element 215' and the lens unit 320' with the third distance 217' maintained simply by coupling the optical-fiber fixing block 300' or an assembly of the optical-fiber fixing block 300' and the alignment plate 220', each having a predetermined height with the baseplate 210'.

Details of the transmission path expander 1' are further described below.

Figure 6A:
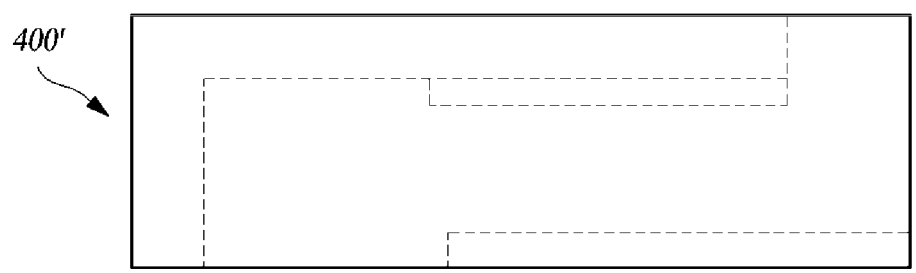
FIG. 6A is a side view of a housing according to the first embodiment.
Figure 6B:
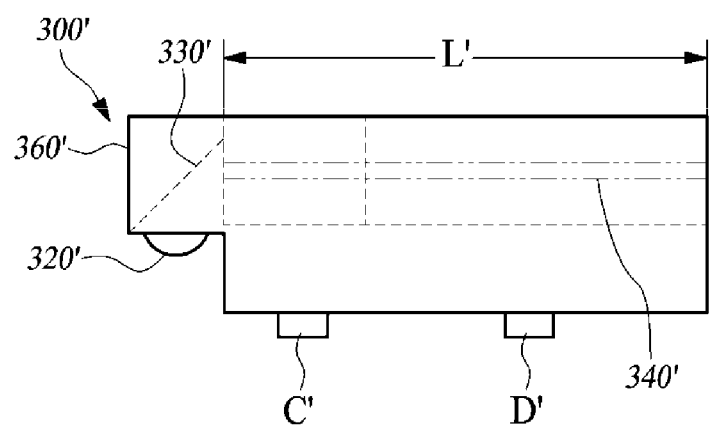
FIG. 6B is a side view of an optical-fiber fixing block according to the first embodiment.
Figure 6C:
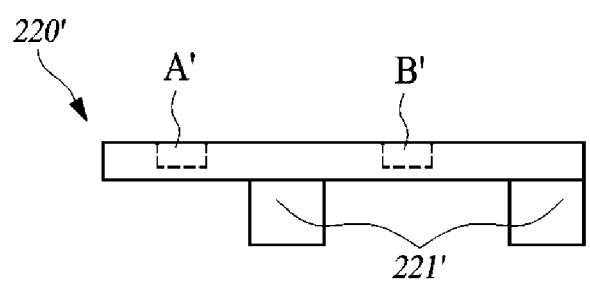
FIG. 6C is a side view of an alignment plate according to the first embodiment.
Figure 6D:
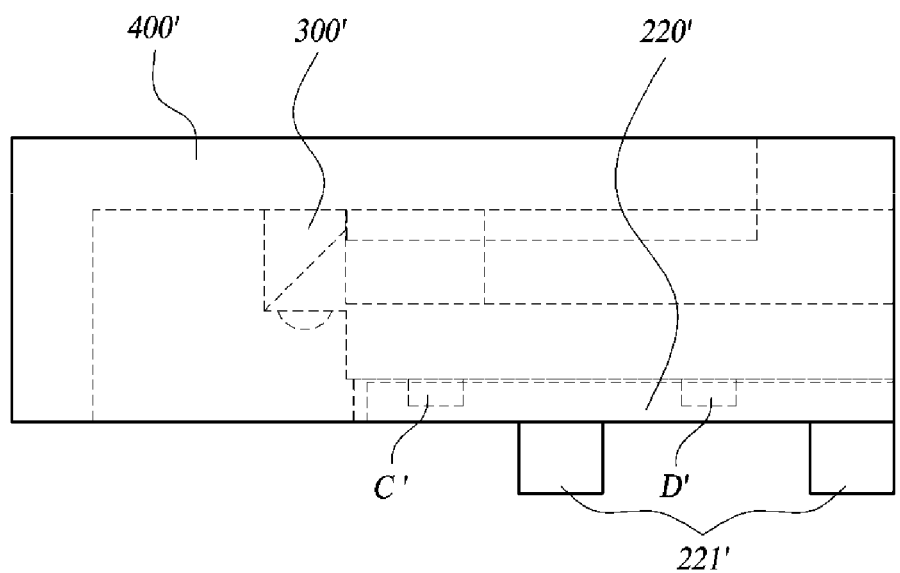
FIG. 6D is a side view of an assembly of a housing, an optical-fiber fixing block, and an alignment plate according to the first embodiment.

FIG. 6A is a side view of a housing 400' according to the first embodiment. FIG. 6B is a side view of an optical-fiber fixing block 300' according to the first embodiment. FIG. 6C is a side view of the alignment plate 220' according to the first embodiment. FIG. 6D is a side view of an assembly of the housing 400', the optical-fiber fixing block 300' and an alignment plate 220' according to the first embodiment.

Referring to FIGS. 6A to 6D, the alignment plate 220' is coupled with the optical-fiber fixing block 300' at its bottom, and the housing 400' encloses the optical-fiber fixing block 300' and the alignment plate 220'. The housing 400' serves to protect the optical transceiver device 1' from an external impact, which helps to reduce an error of the optical alignment.

The transmission path expander 1' according to the first embodiment includes the mounting unit 221'. The mounting unit 221' is arranged on the bottom of the alignment plate 220'. The mounting unit 221' takes a role of mounting the alignment plate 220' and thus the transmission path expander 1' on the baseplate 210'. In some embodiments, the mounting unit 221' includes at least two fixing posts. The baseplate 210' includes fixing holes respectively corresponding to the fixing posts, and the transmission path expander 1' can be mounted on the baseplate 210' by inserting the fixing posts on the alignment plate 220' into the fixing holes.

Referring back to FIG. 2 where the third baseline 350' is defined to as the virtual line passing through the first post C' and the second post D', some embodiments arrange the fixing posts 221' in a row on the third baseline 350'. This structure reduces the volume of the transmission path expander 1'. This aspect will be described later.

The optical-fiber fixing block 300' and the alignment plate 220' are described in more detail below.

Figure 7A:
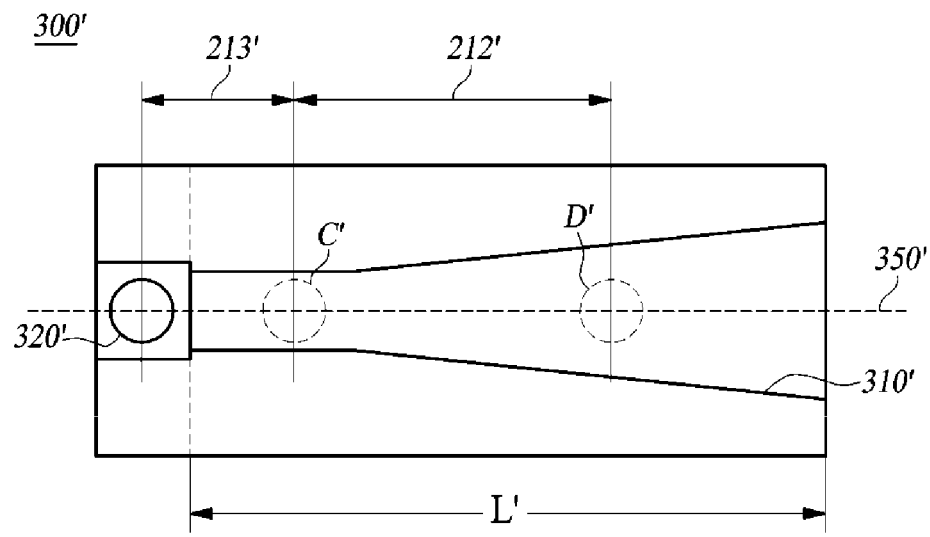
FIG. 7A is a top view of the optical-fiber fixing block according to the first embodiment.
Figure 7B:
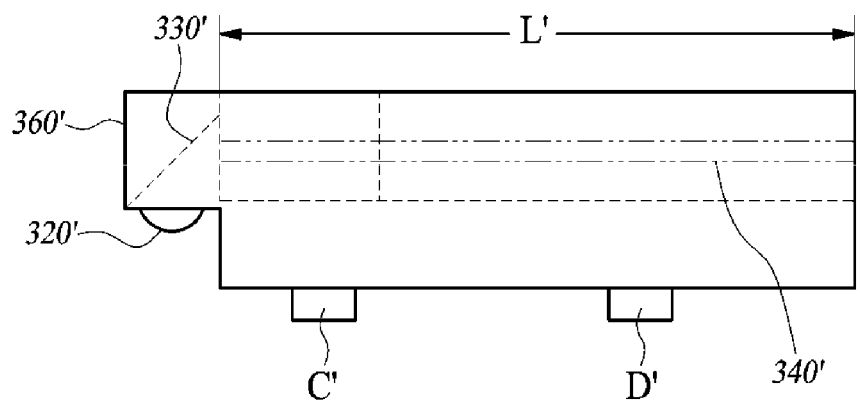
FIG. 7B is a side view of the optical-fiber fixing block according to the first embodiment.

FIG. 7A is a top view of the optical-fiber fixing block 300' according to the first embodiment. FIG. 7B is a side view of the optical-fiber fixing block 300' according to the first embodiment.

The optical fiber 340' can be fixedly mounted in the optical-fiber fixing block 300'. The optical-fiber fixing block 300' includes an optical-fiber guide unit 310' that guides the optical fiber 340' internally thereof. The optical-fiber guide unit 310' is formed in a tapered manner in which the cross section is increased from the inner side toward the outer opening, to guide the facet of the optical fiber 340' to a predetermined position.

In some embodiments, under the guidance of the optical-fiber guide unit 310', the optical fiber 340' is inserted into the optical-fiber fixing block 300' by a mounting length L' to be seated therein. The secured mounting length L' of the optical fiber 340' in the optical-fiber fixing block 300, ensures the stability and durability that the optical transceiver device needs. The optical-fiber guide unit 310' serves to guide the optical fiber 340' for allowing the optical fiber 340' to be arranged while securing the mounting length L' in the longitudinal direction of the optical fiber 340'.

In some embodiments, the optical-fiber fixing block 300' includes a protruding portion 360' that protrudes along the longitudinal direction of the optical fiber 340'. The lens unit 320' is fixedly mounted to face the downward direction on the bottom of the protruding portion 360'. That is, the lens unit 320' is fixedly mounted to face a direction perpendicular to the longitudinal direction of the optical fiber 340'. When the transmission path expander according to some embodiments is mounted on the baseplate 210' with the above-mentioned structure, the optical element 215' and the lens unit 320' arranged at their set positions on the baseplate 210' are allowed to face each other.

The longitudinal direction of the optical fiber 340' fixed mounted in the optical-fiber fixing block 300' includes the same direction as that of the first baseline 211' or the third baseline 350'. As described above, the optical fiber 340' needs the mounting length L' of a predetermined amount. Therefore, when the first post C', the second post D', the first reference hole A', and the second reference hole B' are arranged in the longitudinal direction, the space required by the optical fiber 340' is shared by the first post C', the second post D', the first reference hole A' and the second reference hole B', and hence the optical transceiver device can be downsized.

Figure 8A:
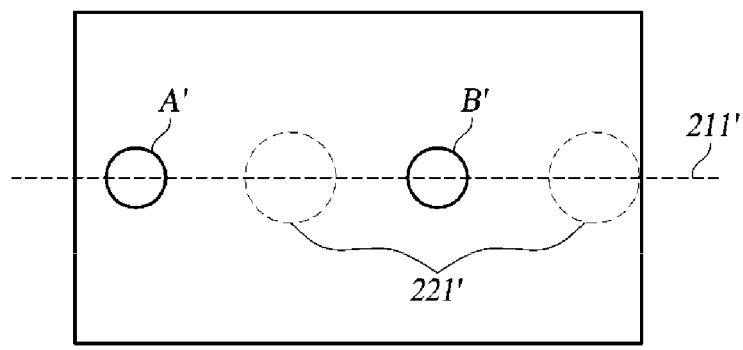
FIG. 8A is a top view of the alignment plate according to the first embodiment.
Figure 8B:
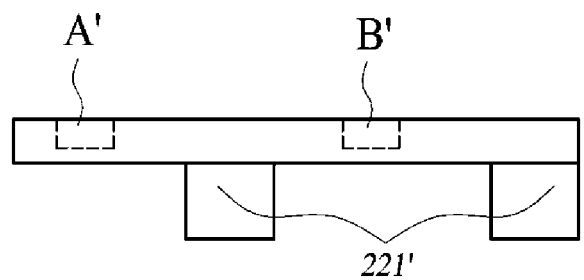
FIG. 8B is a side view of the alignment plate according to the first embodiment.

FIG. 8A is a top view of the alignment plate 220' according to the first embodiment. FIG. 8B is a side view of the alignment plate 220' according to the first embodiment.

The first reference hole A' and the second reference hole B' need a precision machining which, however, is not a requirement to the alignment plate 220' itself. Therefore, the alignment plate 220' can be mass produced at low cost by using a plastic molding method. The mounting unit 221' under the alignment plate 220' does not need to be precisely machined, either. A manufacturer can optically align the optical element 215' with the optical fiber 340' simply by coupling the transmission path expander 1' according to some embodiments of the present disclosure on the baseplate 210' on which the optical element 215' is mounted.

Figure 9:
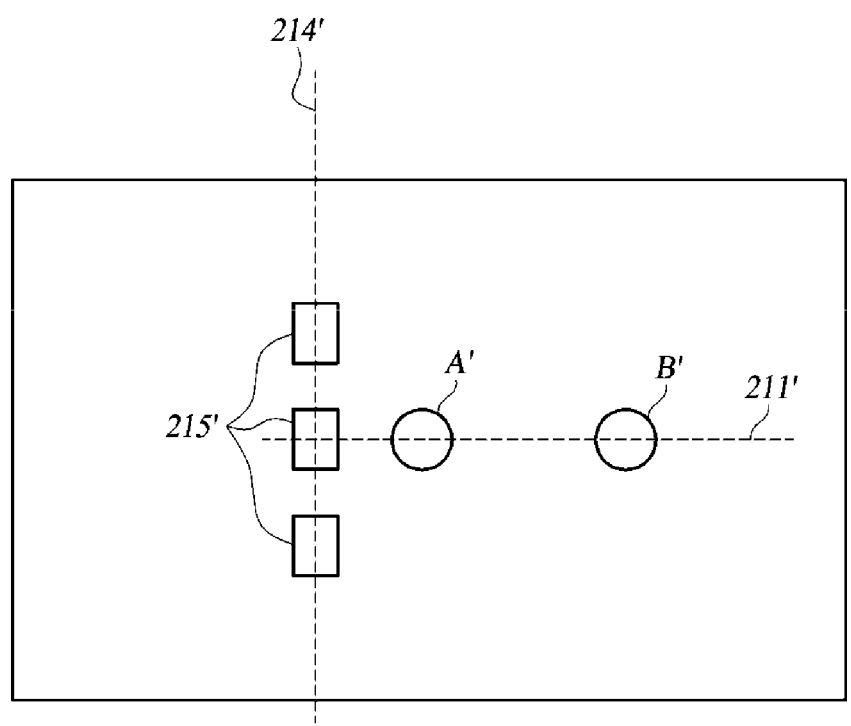
FIG. 9 is a plan view a baseplate arranged with a plurality of optical elements, illustrating a modification of the optical transceiver device according to the first embodiment.

FIG. 9 is a plan view the baseplate 210' arranged with a plurality of optical elements 215', illustrating a modification of the optical transceiver device 1' according to the first embodiment.

Although three optical elements 215' are shown in FIG. 9, two or four or more optical elements can be arranged at the set position. As described above, the set position is determined by the first baseline 211' and the second baseline 214'. As shown in FIG. 9, the optical elements 215' are arranged in a row along the second baseline 214'; however, in some embodiments, the optical elements 215' can be arranged in two or more rows along the second baseline 214'.

<Second Embodiment>

A transmission path expander 1' according to a second embodiment of the present disclosure is configured to be mounted on the baseplate 210' which include an optical element 215' mounted thereon, the first reference hole A' and the second reference hole B' formed with the first distance 212' between the first reference hole A' and the second reference hole B'. The transmission path expander 1' includes the optical-fiber fixing block 300' configured to mount at least one optical fiber 340' and the lens unit 320' in a fixed manner, and it includes the first post C' configured to be inserted into the first reference hole A' and the second post D' configured to be inserted into the second reference hole B'. The transmission path expander 1' also includes the housing 400' configured to enclose the optical-fiber fixing block 300'.

The second post D' can be more loosely inserted into the second reference hole B' than when the first post C' is inserted into the first reference hole A' so that the second post D' is more movable in the second reference hole B'.

The transmission path expander 1' according to the second embodiment includes the housing 400' and the optical-fiber fixing block 300', but does not necessarily include the alignment plate 220'. The transmission path expander 1' according to the second embodiment is directly mounted on the baseplate 210' free of the alignment plate 220' or mounted on the baseplate 210' with the alignment plate 220' mounted, thus forming a structure in which the optical element 215' and the optical fiber 340' are optically aligned.

Except for the above feature, the configuration and the method for aligning the optical element according to the second embodiment are similar to those of the first embodiment.

<Third Embodiment>

An optical transceiver device 1 according to a third embodiment of the present disclosure has a structure corresponding to the transmission path expanders 1' according to the first and second embodiments.

Figure 10:
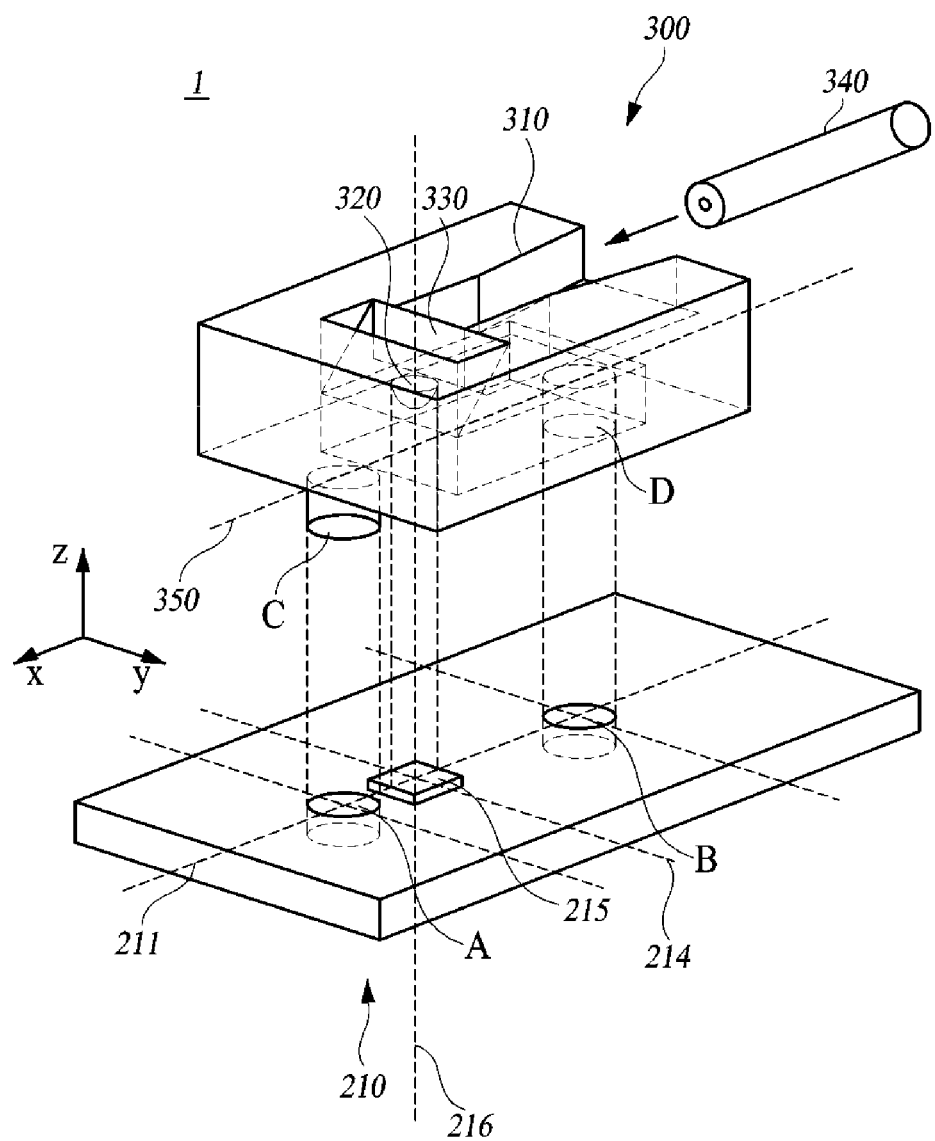
FIG. 10 is a perspective view of an optical transceiver device according to a third embodiment of the present disclosure.
Figure 11:
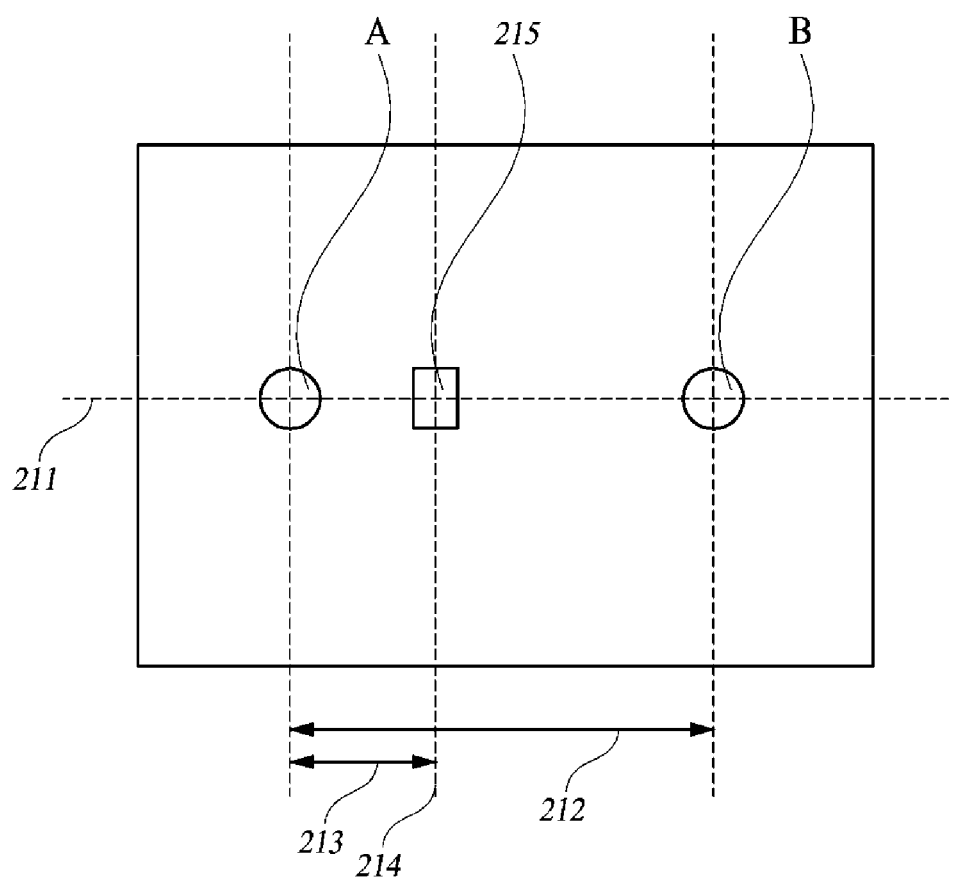
FIG. 11 is a plan view of a baseplate formed with a first reference hole and a second reference hole and mounted with an optical element, according to the third embodiment.
Figure 12:
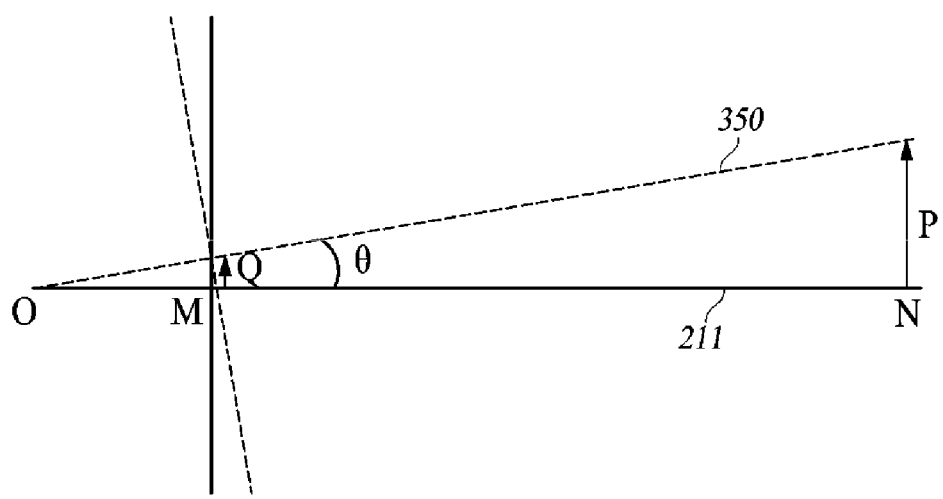
FIG. 12 is a schematic diagram for illustrating a method for aligning an optical element, according to the third embodiment.
Figure 13:
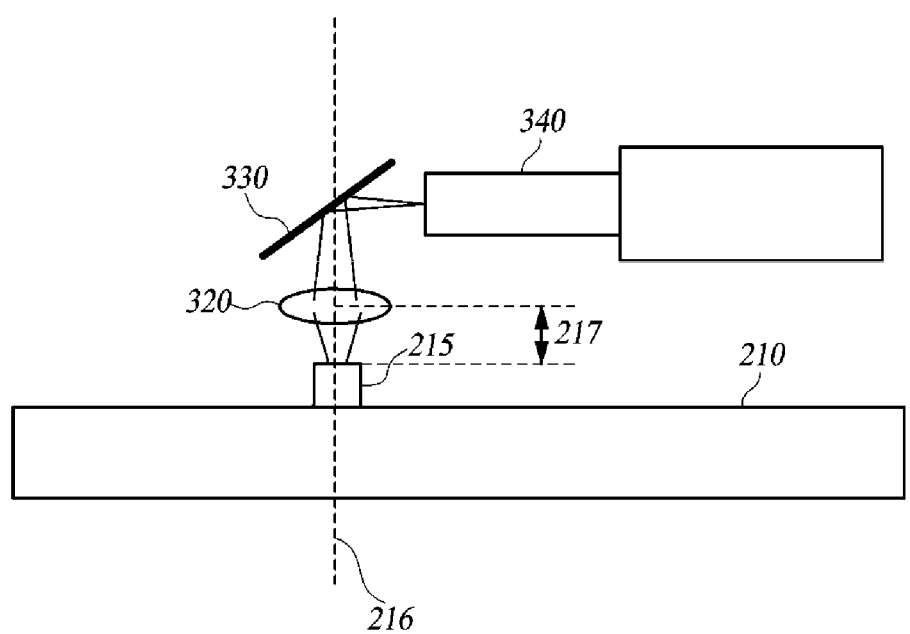
FIG. 13 is a schematic diagram for illustrating an optical alignment of an optical element and a lens unit, according to the third embodiment.

FIG. 10 is a perspective view of an optical transceiver device 1 according to a third embodiment of the present disclosure. FIG. 11 is a plan view of a baseplate 210 formed with a first reference hole A and a second reference hole B and mounted with an optical element 215, according to the third embodiment. FIG. 12 is a schematic diagram for illustrating a method for aligning an optical element, according to the third embodiment. FIG. 13 is a schematic diagram for illustrating an optical alignment of the optical element 215 and a lens unit 320, according to the third embodiment.

Referring to FIGS. 10 and 11, the optical transceiver device 1 according to the third embodiment includes a baseplate 210 and an optical-fiber fixing block 300. The baseplate 210 includes a set position for mounting an optical element 215, a first reference hole A, and a second reference hole B spaced by a first distance 212 from the first reference hole A. The optical-fiber fixing block 300 is configured to fixedly mount at least one of a lens unit 320 and an optical fiber 340 optically linked with the optical element 215, and it includes a first post C configured to be inserted into the first reference hole A and a second post D configured to be inserted into the second reference hole B.

The baseplate 210 according to the third embodiment shown in FIG. 10 includes the first reference hole A and the second reference hole B along a first baseline 211 on the top thereof and the optical element 215 at a position where the first baseline 211 and a second baseline 214 intersect with each other. The optical-fiber fixing block 300 includes an optical-fiber guide unit 310, the lens unit 320, a reflecting unit 330 and the optical fiber 340, and further includes the first post C and the second post D along a third baseline 350 on the bottom of the optical-fiber fixing block 300.

The set position is determined by the first baseline 211 that passes through the first reference hole A and the second reference hole B, and a second baseline 214 that intersects with the first baseline 211 and is positioned between the first reference hole A and the second reference hole B with a second distance 213 from the first reference hole A. The second distance 213 may be shorter than the first distance 212.

The first baseline 211 is determined by the first reference hole A and the second reference hole B. That is, the first baseline 211 is a line passing through the first reference hole A and the second reference hole B. In some embodiments, the first baseline 211 is a line passing through the center of the first reference hole A and the center of the second reference hole B. In this case, the first distance 212 is defined by an interval between the center of the first reference hole A and the center of the second reference hole B.

The second baseline 214 is determined by the first baseline 211, the first reference hole A and the second distance 213. The second baseline 214 intersects with the first baseline 211 on the baseplate 210. In some embodiments, the second baseline 214 intersects with the first baseline 211 at right angle on the baseplate 210.

The second baseline 214 according to the third embodiment is located between the first reference hole A and the second reference hole B, and intersects with the first baseline 211 at a position having the second distance 213 from the first reference hole A. In this case, the second distance 213 is shorter than the first distance 212.

The set position according to the third embodiment is located on the second baseline 214. That is, as the optical element 215 is arranged at the set position, the optical element 215 is located on the second baseline 214 on the baseplate 210. Further, in some embodiments, the optical element 215 is arranged at a position where the second baseline 214 and the first baseline 211 intersect with each other.

When the optical element 215 includes a single unit of optical element, as shown in FIG. 10, the center of a light emitting portion or a light receiving portion of the optical element 215 is located at a position where the second baseline 214 and the first baseline 211 intersect with each other. On the other hand, when there are multiples of the optical element 215, the multiple optical elements are arranged in a row or in a plurality of rows along the second baseline 214.

The second post D is inserted into the second reference hole B in a looser manner than when the first post C is inserted into the first reference hole A. In some embodiments, the diameter of the second post D is smaller than that of the first post C, such that the second post D is inserted into the second reference hole B in a looser manner than when the first post C is inserted into the first reference hole A. Further, in some embodiments, the diameter of the second reference hole B is larger than that of the first reference hole A, such that the second post D is inserted into the second reference hole B in a looser manner than the first post C being inserted into the first reference hole A.

Referring to FIG. 13, in the same manner as the first embodiment, light emitted from a facet of the optical fiber 340 is deflected by the reflecting unit 330 and focused by the lens unit 320 before arriving at the optical element 215, and light emitted from the optical element 215 is focused by the lens unit 320 and deflected by the reflecting unit 330 before arriving at the facet of the optical fiber 340.

The ratio of the second distance 213 to the first distance 212 can be set to allow the optical fiber 340 and the lens unit 320 to be optically aligned within a predetermined tolerance.

When the first baseline 211 and the third baseline 350 match each other, the optical element 215 and the lens unit 320 can be arranged on a fourth baseline 216. In this case, the optical element 215 and the lens unit 320 can be arranged with a third distance 217 maintained therebetween.

The third distance 217 can be determined by a height of a position of the lens unit 320 in the optical-fiber fixing block 300.

The optical transceiver device 1 according to the third embodiment is further described with reference to FIGS. 10, 11 and 12.

The first reference hole A, the second reference hole B and the optical element 215 are shown on the baseplate 210' in FIG. 10. The coordinates are represented by x-axis in the longitudinal direction of the baseplate 210', y-axis in the lateral direction of the baseplate 210', and z-axis in the width direction of the baseplate 210'.

FIG. 11 shows a point M corresponding to the first reference hole A, a point N corresponding to the second reference hole B, and a point O corresponding to the optical element 215. The points M, N and O can be located on the first baseline 211.

With reference to FIG. 12, the following describes an offset in the horizontal direction (or on a plane defined by the x-axis and the y-axis) when the first post C and the second post D of the optical-fiber fixing block 300 are respectively fitted into the first reference hole A and the second reference hole B on the baseplate 210.

An angle θ in FIG. 12 is generated from an axis parallel to the z-axis as a rotation axis, and a line forming the angle θ with the first baseline 211 is the third baseline 350 which is a line passing through the first post C and the second post D of the optical-fiber fixing block 300. In some embodiments, the third baseline 350 is a line passing through the center of the first post C and the center of the second post D.

The interval between the center of the first post C and the center of the second post D is as far as the first distance 212. That is, the distance between the center of the first post C and the center of the second post D can be the same as the distance between the center of the first reference hole A and the center of the second reference hole B.

The lens unit 320 is located on the third baseline 350 as viewed in the top view of the optical-fiber fixing block 300. Specifically, the lens unit 320 is located on the third baseline 350 at a position with the second distance 213 from the first post C.

When the optical-fiber fixing block 300 is mounted on the baseplate 210, the first post C is tightly inserted into the first reference hole A. However, the second post D is inserted into the second reference hole B in a looser manner than the first post C being inserted into the first reference hole A. Therefore, the second post D is movable in the second reference hole B.

As a result, the third baseline 350 is slightly movable in the clockwise direction or in the counterclockwise direction with the z-axis as a rotation axis, and hence the first baseline 211 may match the third baseline 350 or they may be misaligned.

The fourth baseline 216 is defined in a direction perpendicular to the z-axis. The fourth baseline 216 is a virtual line that is perpendicular to the first baseline 211 and the second baseline 214 and that intersects with the second baseline 214. When the first baseline 211 and the third baseline 350 match each other, the optical element 215 is arranged on the fourth baseline 216. That is, the optical element 215 and the lens unit 320 can be arranged on the same axis.

Features of the third embodiment will be described in more detail below with reference to the above-mentioned first embodiment.

Referring to FIG. 3A, the baseplate 210' includes thereon the optical element 215' and the two circular holes A' and B'. Referring to FIG. 3B, the baseplate 210' includes thereon the optical element 215' and the alignment plate 220', and the alignment plate 220' includes the two circular holes A' and B'. In the example shown in FIG. 3B, the alignment plate 220' is coupled with the baseplate 210' with a separate coupling structure on the baseplate 210', and the two circular holes A' and B' are included in the alignment plate 220'. The two reference holes A' and B' are formed on the first baseline 211' with the first distance 212', and the optical element 215' is arranged on the second baseline 214' on the opposite side of the second reference hole B' at a position apart from the first reference hole A' by the second distance 213' with the first reference hole A' therebetween. Respectively fitting the posts C' and D' formed on the optical-fiber fixing block 300' in a protruding manner into the reference holes A' and B' causes the optical element 215', the lens unit 320' and the optical fiber 340' to be optically aligned.

The concept of the method for aligning an optical element according to the first embodiment is shown in FIG. 4.

FIG. 4 shows a point O' corresponding to the first reference hole A', a point N' corresponding to the second reference hole B', and a point M' corresponding to the optical element 215'. The points M', N' and O' may be located on the first baseline 211'.

When the optical-fiber fixing block 300' is slightly moved by an angle θ' in the clockwise direction or the counterclockwise direction with reference to the point O', a longitudinal motion of the axis of the optical-fiber fixing block is represented by the third baseline 350'. The ratio of line O'-M' to line O'-N' equals to the ratio of a distance Q' traveled by the point M' to a distance P' traveled by the point N'. Q' is a distance the lens unit moves, and P' is a distance the post of the optical-fiber fixing block slightly moves in the circular hole B' in their engagement.

In case of the third embodiment of the present disclosure, the third baseline 350 is shown in FIG. 12 where the optical-fiber fixing block 300 slightly moves by the angle θ in the clockwise direction or the counterclockwise direction about the point O. The ratio of line O-M to line O-N can be represented by the ratio of a distance Q traveled by the point M and a distance P traveled by the point N.

When comparing this with FIG. 4, assuming that the other conditions are the same (particularly, that distances P' and P have the same value), the movement by distance P exhibits values Q and Q' that represent deviations of the lens unit where Q'>Q, and hence the present embodiment has less sensitive or smaller deviation of the lens unit than that of the first embodiment improved over the prior art.

The first embodiment enables the manufacturing process to be simplified as it is relatively free from an interference with peripheral members because the optical element 215' and the lens unit 320' are arranged on the outer side of the reference hole.

It should be understood by a PHOSITA that the first embodiment and the third embodiment can be selectively combined as appropriate within the scope of the present disclosure, and that the first and third embodiments are based on the same technical idea.

As described above, the optical transceiver device according to the third embodiment as compared to the first embodiment has the same or superior effects.

Firstly, the deviations generated when optically aligning the lens unit 320 and the optical element 215 can be reduced. Secondly, as long as the offset is generated within the tolerance while optically aligning the lens unit 320 and the optical element 215, the tolerance can be increased therefrom when forming the reference holes A and B on the baseplate 210, and a separate component such as the alignment plate 220' can be eliminated different from the first embodiment. That is, the third embodiment obviates the need for the alignment plate 220' in the first embodiment due to its precision requirement for the optical alignment of the lens unit 320 with the optical element 215. This not only facilitates the process of manufacturing the components simple but also increases the economic feasibility. Further, the optical element 215 can be arranged between the reference holes A and B, which reduces the volume of the entire optical transceiver device. Accordingly, this can contribute to the downsizing of state of art information communication devices.

The optical-fiber fixing block 300 according to the third embodiment will be described in more detail below.

Figure 14A:
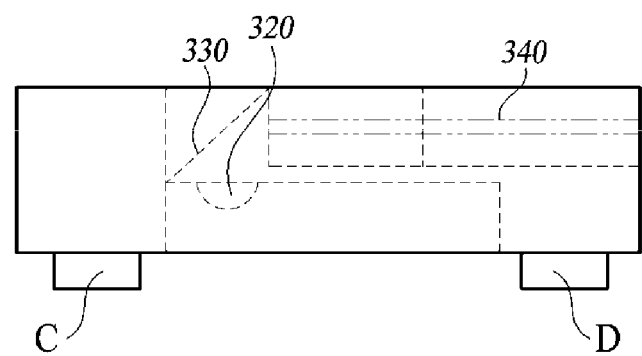
FIG. 14A is a side view of an optical-fiber fixing block according to the third embodiment.
Figure 14B:
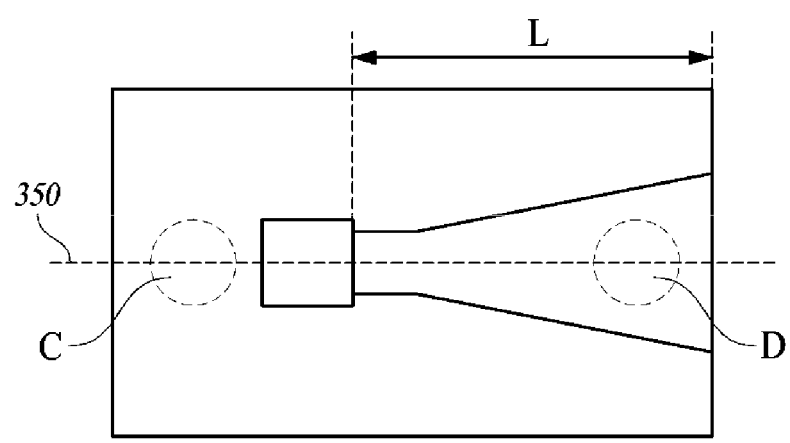
FIG. 14B is a plan view of the optical-fiber fixing block according to the third embodiment.

FIG. 14A is a side view of the optical-fiber fixing block according to the third embodiment. FIG. 14B is a plan view of the optical-fiber fixing block according to the third embodiment.

The optical-fiber fixing block 300 has the optical fiber 340 and the lens unit 320 mounted therein in a fixed manner. The optical-fiber fixing block 300 includes the optical-fiber guide unit 310 that guides the optical fiber 340 in the inward direction. The optical-fiber guide unit 310 is formed straight or in a tapered manner such that the cross section increases from the inner side to the outer opening side, to guide the facet of the optical fiber 340 to a predetermined position.

The optical fiber 340 is inserted into the optical-fiber fixing block 300 by the mounting length L along the longitudinal direction. The optical fiber 340 secures the mounting length L by a predetermined length for safe mounting in the optical-fiber fixing block 300.

In the same manner as the first embodiment, the third embodiment has the lens unit 320 fixedly mounted on a portion of the optical-fiber fixing block 300 in a direction facing the bottom of the optical-fiber fixing block 300.

The optical fiber 340 is arranged in a structure for making an optical alignment, and the reflecting unit 330 includes, for example, a mirror or a prism.

The posts C and D according to some embodiments are portions protruding from the optical-fiber fixing block 300 on one side. Further, the posts C and D can be manufactured by injection molding integral to the optical-fiber fixing block 300.

The third embodiment adopts a structure for inserting the second post D into the second reference hole B in a looser manner than inserting the first post C into the first reference hole A, and thus prevents a deformation from occurring during forcibly fitting the optical-fiber fixing block 300 into the baseplate 210. As a result, a precise optical alignment can be obtained, providing the optical transceiver device with an enhanced durability.

The longitudinal direction of the optical fiber 340 fixedly mounted in the optical-fiber fixing block 300 includes the same direction as that of the first baseline 211 or the third baseline 350. As described above, the optical fiber 340 needs to have the mounting length L of a predetermined amount.

Figure 15:
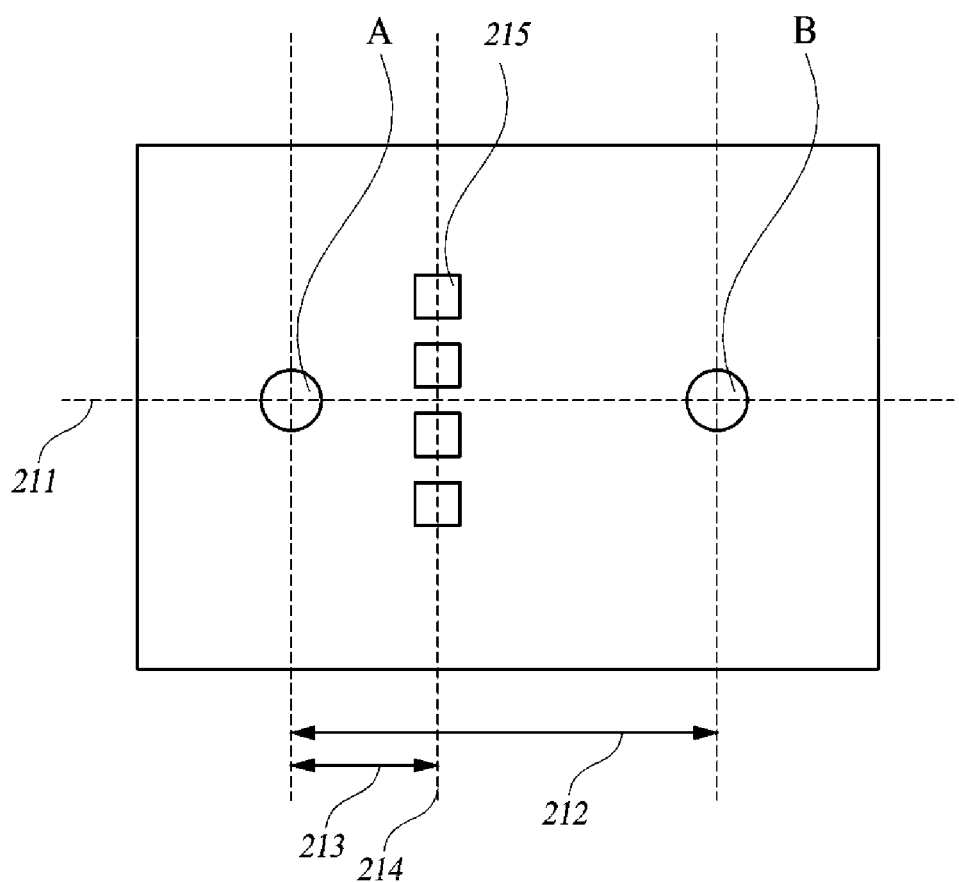
FIG. 15 illustrates a modification to the optical transceiver device according to the third embodiment in a plan view of the baseplate arranged with a plurality of optical elements.

FIG. 15 illustrates a modification to the optical transceiver device 1 according to the third embodiment in a plan view of the baseplate 210 on which a plurality of optical elements 215 is arranged.

FIG. 15 illustrates multiples of the optical element 215 different from the embodiment shown in FIG. 10. In this case, four optical elements 215 are arranged on the baseplate 210, mounted in a row at regular intervals on the second baseline 214. In some embodiments, unlike the example shown in FIG. 3, the optical elements 215 are arranged in two or more rows along the second baseline 214. Further, the number of the optical elements 215 can be three, four, six, eight, or the like depending on the required specification.

Figure 16A:
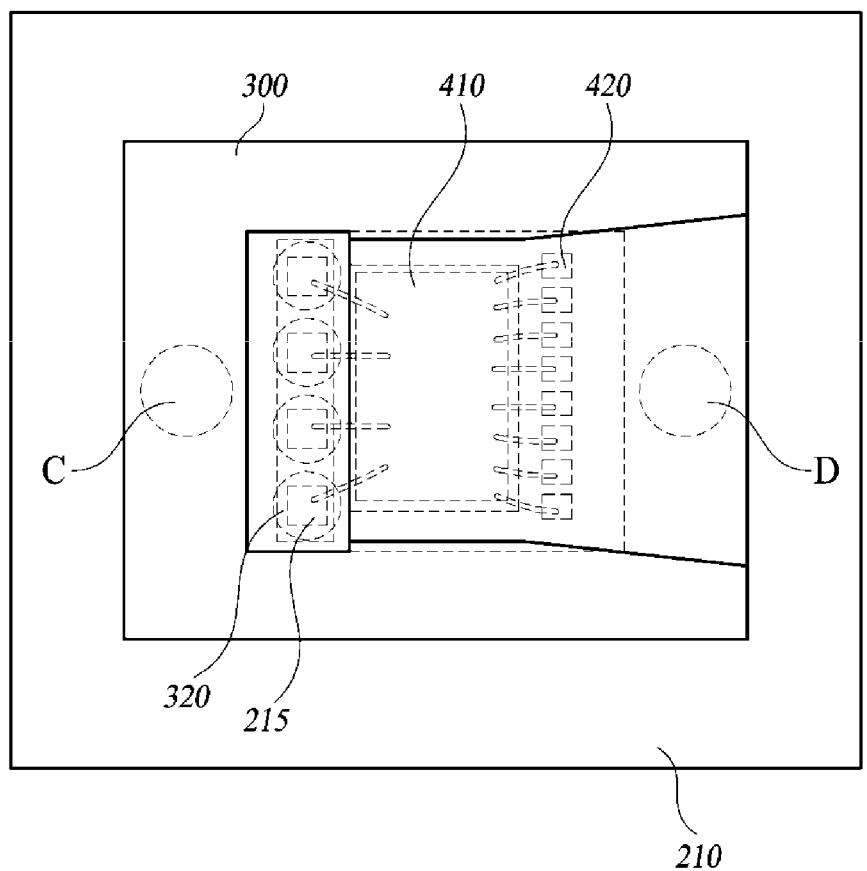
FIG. 16A is a top view of an assembly of a baseplate and an optical-fiber fixing block according to a modification of the third embodiment.
Figure 16B:
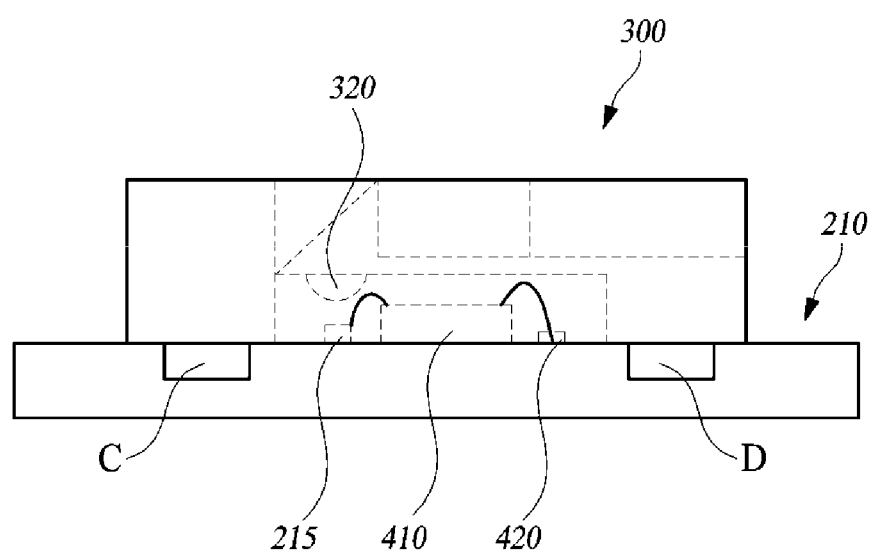
FIG. 16B is a side view of an optical-fiber fixing block enclosing an optical element, an integrated circuit and a signal channel on top of a baseplate, according to a modification of the third embodiment.

FIG. 16A is a top view of an assembly of the baseplate 210 and the optical-fiber fixing block 300 according to a modification of the third embodiment. FIG. 16B is a side view of the optical-fiber fixing block 300 enclosing the optical element 215, an integrated circuit 410 and a signal channel 420 on top of the baseplate 210, according to a modification of the third embodiment.

Referring to FIGS. 16A and 16B, the baseplate 210 according to the modified third embodiment includes an integrated circuit (IC) 410 on the top thereof and a signal channel 420 connected to the integrated circuit 410. The four optical elements 215, the integrated circuit 410 and the signal channel 420 are provided on the baseplate 210, which is surrounded by the optical-fiber fixing block 300 according to the modified third embodiment, to protect these components from the external physical, chemical and electrical impacts. With the modified third embodiment, a simple optical alignment of the optical elements 215, the lens unit 320, and the optical fiber 340 can be obtained as well as the excellent durability, and at the same time, misalignment can be minimized.

The baseplate 210 according to the modified third embodiment further includes a signal line 510 that interconnects the signal channel 420 and a connector 520.

Figure 17A:
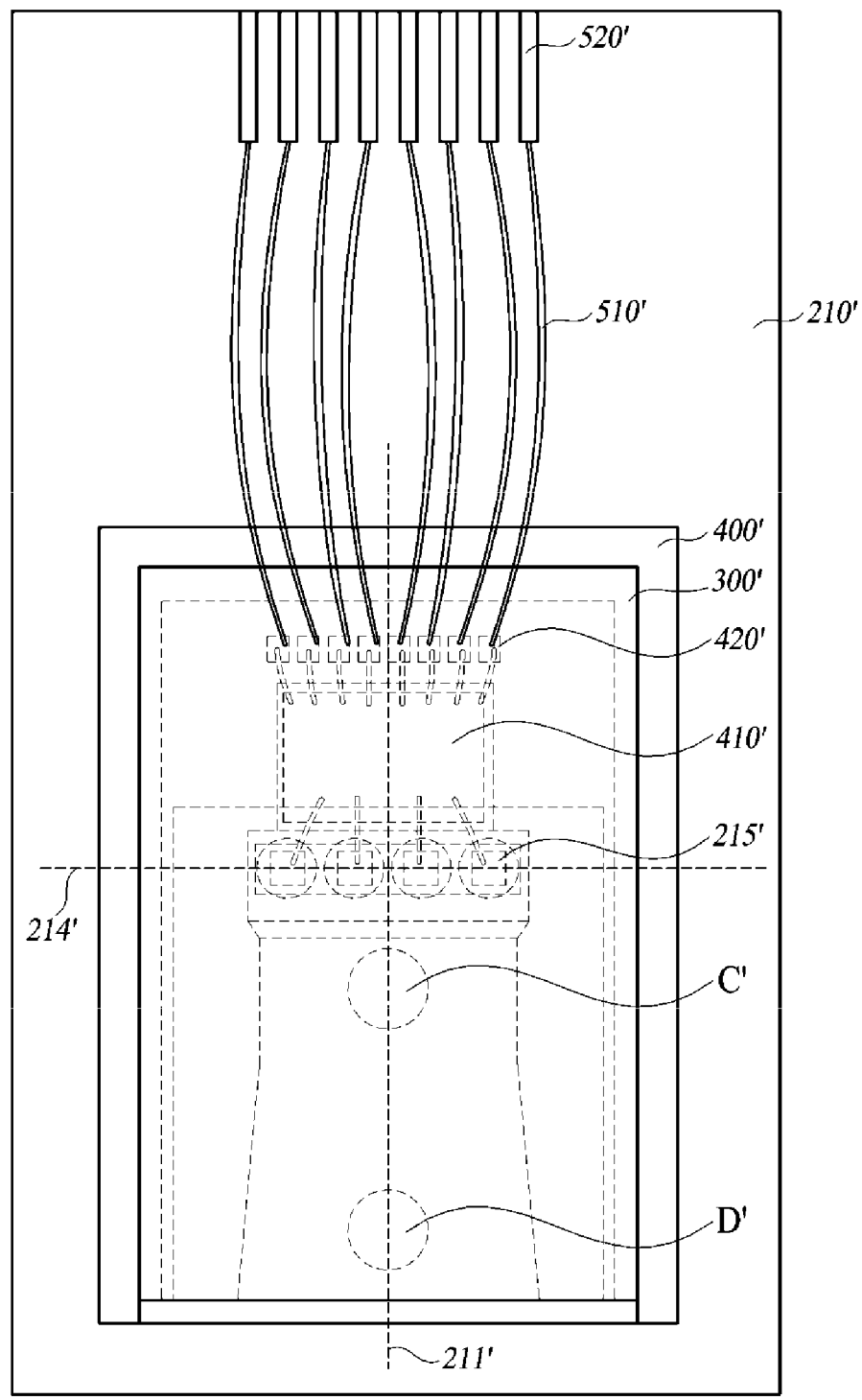
FIG. 17A is a plan view of the optical transceiver device according to the first embodiment having a printed circuit board with a connected high-speed electrical signal line pattern.
Figure 17B:
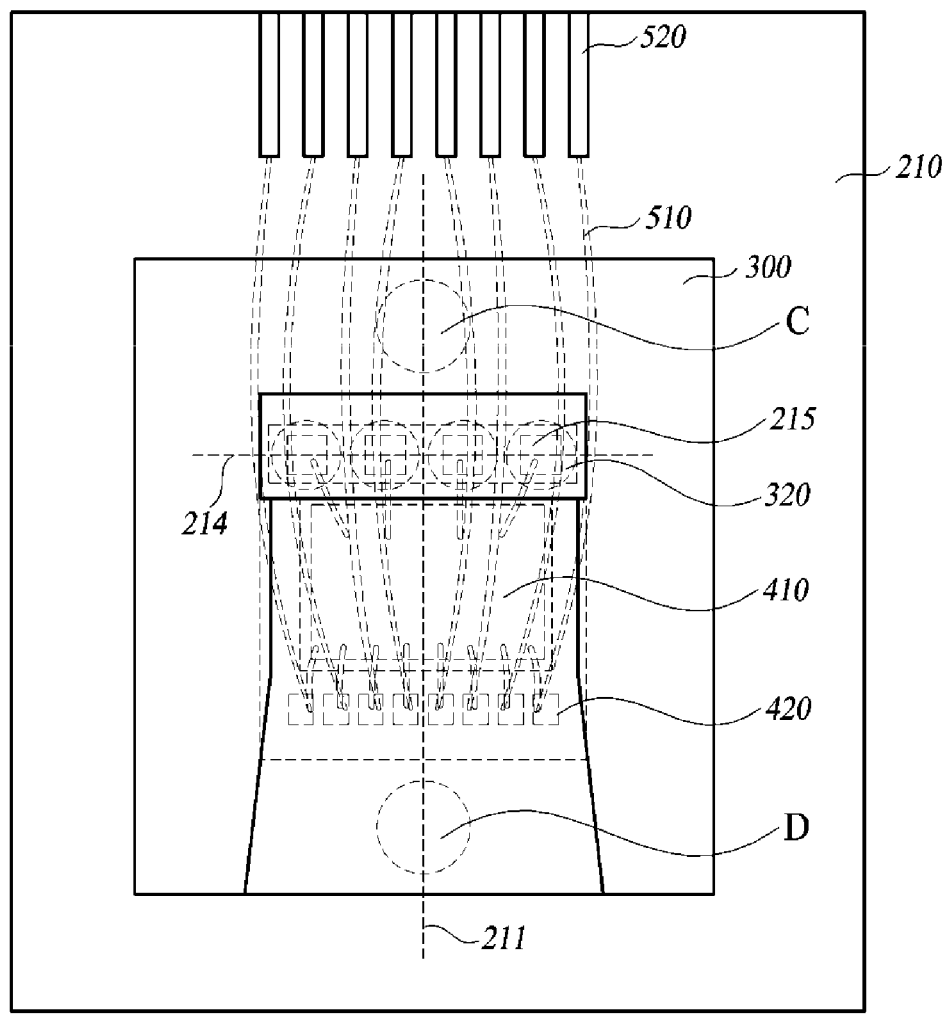
FIG. 17B is a plan view of the optical transceiver device according to the third embodiment having a printed circuit board with a connected high-speed electrical signal line pattern.

FIG. 17A is a plan view of the optical transceiver device 1' according to the first embodiment having a printed circuit board with a connected high-speed electrical signal line pattern. FIG. 17B is a plan view of the optical transceiver device 1 according to the third embodiment having a printed circuit board with a connected high-speed electrical signal line pattern. The printed circuit board may represent the baseplates 210' and 210.

Referring to FIG. 17A, the optical transceiver device 1' according to the first embodiment is configured such that positions of the integrated circuit 410' and the signal channel 420' are located along the first baseline 211' on the opposite side of the first post C' and the second post D' with reference to the second baseline 214' on which the optical elements 215' are arranged. The optical elements 215', the integrated circuit 410' and the signal channel 420' are electrically connected to each other, and the signal line 510' electrically connects the signal channel 420' with the connector 520'. The housing 400' serves to protect the optical elements 215', the optical-fiber fixing block 300', the integrated circuit 410' and the signal channel 420' from external impacts by accommodating these components therein.

Referring to FIG. 17B, the optical transceiver device 1 according to the third embodiment is configured such that positions of the integrated circuit 410 and the signal channel 420 are located along the first baseline 211 between the first post C and the second post D. The optical elements 215, the integrated circuit 410 and the signal channel 420 are electrically connected to each other, and the signal line 510 electrically connects the signal channel 420 with the connector 520.

The signal line 510 according to the third embodiment is a line that passes through the bottom of the baseplate 210 as is indicated by dashed lines. Further, the optical-fiber fixing block 300 according to the third embodiment is structured to be coupled with the baseplate 210, when the optical-fiber fixing block 300 includes therein the optical elements 215, the integrated circuit 410 and the signal channel 420.

As described above, the third embodiment has an advantage over the first embodiment in terms of downsizing the entire optical transceiver device. Further, to their inherent merits, the first embodiment includes a separate housing 400', while the optical-fiber fixing block 300 according to the third embodiment alone accommodates the optical elements 215, the integrated circuit 410 and the signal channel 420 therein, to protect these components from external impacts, in a simpler manner.

Excluding the above-mentioned features, the configuration and the method for aligning the optical element according to the third embodiment is coherent to those of the first embodiment.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

The invention claimed is:

1. An optical transceiver device, comprising:
   a baseplate including
      a set position for mounting an optical element,
      a first reference hole, and
      a circular second reference hole spaced by a first distance from the first reference hole; and
   an optical-fiber fixing block configured to fixedly mount at least one of a lens unit and an optical fiber optically linked with the optical element, and to include a first post configured to be inserted into the first reference hole and a second post configured to be inserted into the second reference hole, wherein
   the second post is configured to be inserted into the second reference hole in a looser manner than when the first post is inserted into the first reference hole so as to be freely move in all lateral directions by defining the second post to have a diameter smaller than that of the first post or by defining the second reference hole to have a diameter larger than that of the first reference hole,
   the set position is determined by a first baseline that passes through the first reference hole and the second reference hole and by a second baseline that intersects with the first baseline and is positioned between the first reference hole, the second reference hole with a second distance from the first reference hole,
   the optical transceiver device further comprising an integrated circuit over the baseplate, a signal channel connected to the integrated circuit, a connector connected to the signal channel and a signal line configured to connect the signal channel with the connector, and
   wherein the optical-fiber fixing block is structured to be coupled with the baseplate, when the optical-fiber fixing block includes therein the optical element, the integrated circuit and the signal channel.

2. The optical transceiver device of claim 1, wherein the second distance is shorter than the first distance.

3. The optical transceiver device of claim 1, wherein a ratio of the second distance to the first distance is set to allow the optical fiber and the lens unit to be optically aligned with the optical element within a predetermined tolerance.

4. The optical transceiver device of claim 1, wherein the optical fiber is mounted in a longitudinal direction which is the same as a direction viewed from the optical element toward the second reference hole.

5. The optical transceiver device of claim 1, wherein the optical-fiber fixing blocked includes an optical-fiber guide unit configured to fixedly mount the optical fiber in a seated manner and having a cross section increasing toward an outer opening.

6. The optical transceiver device of claim 1, wherein the optical fiber is mounted in a longitudinal direction comprises a same direction as a direction of the first baseline.

7. The optical transceiver device of claim 1, wherein the optical element comprises a plurality of optical elements.

8. The optical transceiver device of claim 7, wherein the plurality of optical elements is arranged in a row along the second baseline.

9. The optical transceiver device of claim 8, wherein the plurality of optical elements is arranged in at least two rows along the second baseline.

10. The optical transceiver device of claim 1, wherein the signal line is arranged to pass under the baseplate.

* * * * *